Nov. 15, 1966    P. REICHBORN-KJENNERUD    3,284,896
BAND CUTTER AND GRIPPER
Filed Jan. 29, 1965
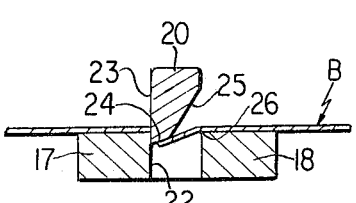
FIG.3
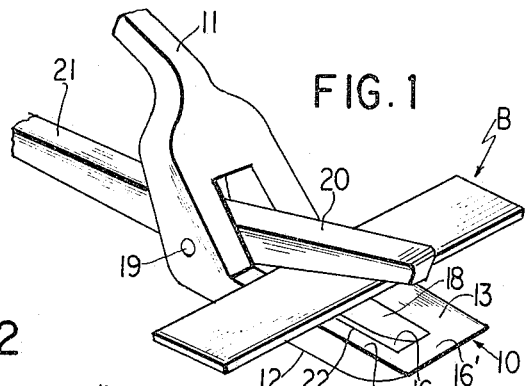
FIG.1
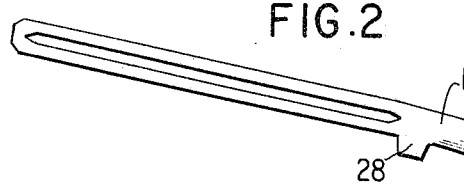
FIG.2
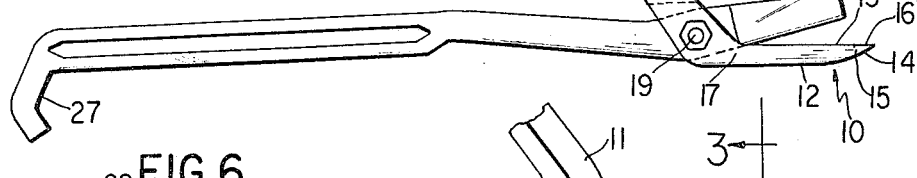
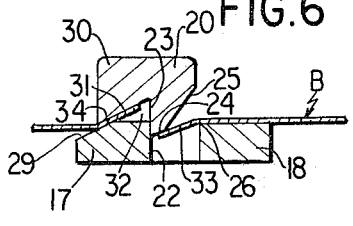
FIG.6
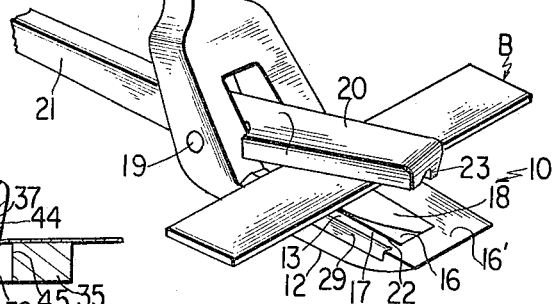
FIG.7    FIG.4
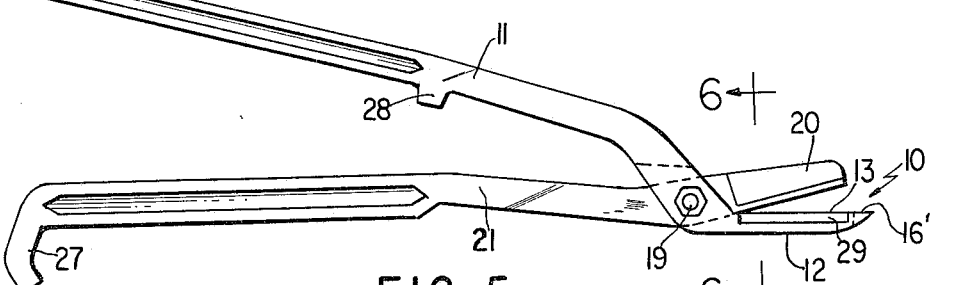
FIG.5
INVENTOR
PER REICHBORN-KJENNERUD
BY
ATTORNEYS

United States Patent Office

3,284,896
Patented Nov. 15, 1966

3,284,896
BAND CUTTER AND GRIPPER
Per Reichborn-Kjennerud, New York, N.Y., assignor to Goodway Tools Corporation, New York, N.Y., a corporation of New York
Filed Jan. 29, 1965, Ser. No. 428,973
1 Claim. (Cl. 30—134)

This is a continuation-in-part of U.S. application Serial No. 354,404, filed March 24, 1964, now abandoned.

This invention relates to metal band cutting tools and particularly to an improved band cutting tool of simple construction which will provide a high degree of safety, preventing injury to personnel as well as to adjacent objects upon the sudden release of the tension on the band.

Metal straps are universally employed to bind crates, cartons, containers, packages, bundles of tubing, bar stock, lumber, bricks, paper or other bulk materials for shipping purposes. These metal bands are placed under substantial tension when applied. When the material reaches its destination and is to be used, the bands are cut. It often occurs that upon sudden release of the tension on such bands, the freed ends will fly apart, frequently injuring personnel or damaging adjacent objects.

Cutters have been proposed for cutting such bands, but they have not proved satisfactory for many reasons, among which is the fact that they require complex, costly constructions which often get out of order, and also require excessive forces to accomplish gripping of the band prior to its being cut.

The principal object of the present invention is to provide a cutter which bends the metal band on one or both sides of the cutting line progressively as the band is being cut. In this way, the bending action progresses behind the actual cutting so that a minimum of force is required to bend and cut the band. This is particularly advantageous where thick metal bands are required as straps.

Another object of the invention is to provide such a cutter in which the jaws of the cutter are fabricated separately in a single piece.

Still another object of the invention is to provide such a cutter in which the bending action takes place so that one edge of the bent portion is the line of severance across the band.

Another object of the invention is to provide such a cutter which comprises unitary handle and cutter parts that are pivotally attached in a manner to prevent dislocation of the cutting blades relative to each other to thereby prevent a gap from developing between the shearing edges of the blades.

In one aspect of the invention, a band cutter may comprise a handle having an anvil portion integral therewith and disposed such that when a flat bottom surface of the anvil is resting on the surface of a container or bundle with a metal strap lying over its top surface, the handle portion is angularly disposed away from the bundle at a substantial angle.

In another aspect of the invention, the anvil portion may be provided with a longitudinally extending slot therethrough forming two parallel spaced bars that are integrally connected at the ends of the slot to provide a rigid structure in which the parallel bars resist separation.

In a still further aspect of the invention, another handle may include an integral cutting blade having a width that very accurately fits between the spaced bars on the anvil portion. A pivot pin may extend across the slot in the anvil member near the point where its handle begins, and may be supported by each of the parallel bars. The other handle and cutting blade may be pivotally mounted on said pin with the cutting blade between the bars.

In still another aspect of the invention, the cutting blade cross section may provide a single cutting edge, with the remainder of the blade cross section relieved so as to provide a substantial space between the cutting edge of the blade and the bar spaced from the one having the cutting edge thereon. In this way, as the cutting action progresses across the band, the one severed edge of the band is bent downwardly into this space between the cutting edge and the other bar. Accordingly, when the band is finally severed, it is prevented from springing away from the location of severance when the tension of the band is suddenly released. It has been found that this simple bending action of the one severed edge over the one bar of the anvil will gradually release the tension of the band when completely severed. Furthermore, since the bending action follows the progression of the severance, the force required to deflect or bend it is minimal.

In still another aspect of the invention, the outer edge of the bar of the anvil portion provided with the cutting edge may be chamfered, and a mating flange may be provided adjacent to and parallel with the cutting edge of the cutting blade. This arrangement bends the one severed edge upwardly while bending the other edge downwardly between the bars, thus providing means for restraining both severed edges from springing outwardly upon completion of the cutting and as the tension in the band is suddenly released. In a further form, the edge of the anvil bar portion may have a cut therein providing a surface substantially parallel to the upper surface of the anvil cooperating with a wider, substantially rectangular cut in the cutting blade for progressively restraining the severed edge.

The above, other objects and novel features of the invention will become apparent from the following specification and accompanying drawings which are merely exemplary.

In the drawings:

FIG. 1 is a perspective view of a band cutter to which the principles of the invention have been applied;

FIG. 2 is a side elevational view of the cutter shown in FIG. 1;

FIG. 3 is a sectional view taken substantially along line 3—3 of FIG. 2;

FIG. 4 is a perspective view of a modified form of the invention;

FIG. 5 is a side elevational view of the cutter shown in FIG. 4;

FIG. 6 is a sectional view taken substantially along line 6—6 of FIG. 5; and

FIG. 7 is a sectional view similar to FIG. 6 showing another form of the invention.

Referring to the drawings, and particularly to FIGS. 1, 2 and 3, the principles of the invention are shown as applied to a band cutter comprising an anvil 10 formed at one end of a handle 11. The anvil 10 may include parallel, flat bottom and top surfaces 12 and 13. The surfaces 12 and 13 may be joined at the leading end 14 by a smooth curve 15 facilitating the sliding of the anvil between a metal band and the bundle or object surrounded by the band.

The handle 11 is integral with anvil 10, and when the surface 12 of the latter is held in contact with the object about which the band is fastened, the handle 11 extends angularly away from the object. Anvil 10 may include an elongated, longitudinally extending slot 16 forming two parallel spaced bars 17 and 18. Slot 16 extends upward into the portion joining the handle 11 to anvil 10, and a pivot pin 19 extends transversely across the slot 16 and is supported at its ends in bars 17 and 18. The slot 16 does not extend to the forward end of anvil 10, and the bars 17 and 18 are connected at the forward end of anvil 10 by an integral portion 16'.

A cutting blade 20 may be integrally attached to a handle 21 and it may be pivotally mounted on pin 19 between bars 17 and 18. Slot 16 may be accurately machined so as to receive blade 20 with a minimum of transverse movement between bars 17 and 18.

Referring to FIG. 3, only one surface 22 of bar 17 and one surface 23 of blade 20 may be sharpened. With a minimum of clearance between blade 20 and bars 17 and 18, and with pin 19 supported by both bars 17 and 18, the cutting surfaces 22 and 23 will not separate and therefore will retain their cutting ability. Additionally, since the bars 17 and 18 are connected at their forward ends by the portion 16', there is no tendency of the bars 17 and 18 to separate.

Referring again to FIG. 3, the blade 20 is provided with surfaces 24 and 25 extending transversely from the cutting surface 23. This enables surfaces 24 and 25 to bend the portion of the band B between the bars 17 and 18 downwardly between said bars about the point 26 of bar 18 as the cutting action progresses transversely across the band B. Accordingly, when the band B is finally severed, the free end of band B is prevented from flying upwardly.

The handle 21 may include an abutment portion 27 adapted to rest on the package having a band B to be severed so that space is provided between handle 21 and the package for the reception of the operator's fingers. Also, handle 11 may include an abutment 28 adapted to limit the movement of handles 11 and 21 toward each other when a cutting action is effected.

Under certain circumstances, only one end of the severed band B need be restrained from flying loose when the tension of the band is released. In other instances, it is preferable to restrain both free ends. Referring to FIGS. 4, 5 and 6, a modified form of the invention is disclosed. In the modification shown in FIGS. 4, 5 and 6, the bar 17 is provided with a chamfer 29 along the edge thereof opposite the cutting edge 22. Additionally, a flange 30 is provided along the cutting surface 23 of blade 20, and it includes an angularly disposed surface 31 adapted to mate with chamfer 29 and to form a recess 32 between surface 31 and the top surface 13 of bar 17.

From the foregoing, it is evident that as the cut progresses transversely across the band B, the trailing cut portion 33 is forced downwardly between bars 17 and 18 about point 26, while portion 34 is forced upwardly into recess 32 and is clamped between chamfer surface 29 on bar 17 and surface 31 on flange 30. Since these bending operations occur from the very edge of the severance, and only after the cutting has occurred (the cutting always preceding the bending action), it is evident that a minimum of bending force is required, and that a maximum of force applied to the handles 11 and 12 is utilized for the actual severing action.

A still further form of the invention is illustrated in FIG. 7 wherein anvil bar 35 has cutting surface 36 cooperating with cutting surface 37 of slot 38 similar to FIG. 6. The cutting edge side of the anvil bar 35, surfaces 39 and 40 cooperate with slot 41 to progressively hold the severed edge 42 as it is cut. In this form, slots 38 and 41 can be cut with an ordinary milling machine cutter or the like. The slot 41 is made wider than the flange 43. The distance of edge 44 from wall 45 and of edge 46 from wall 40 will depend upon the thickness of the band being cut.

Although the various features of the improved band cutting tool have been shown and described in detail to fully disclose three embodiments of the invention, it will be evident that changes may be made in such details and certain features may be used without others without departing from the principles of the invention.

What is claimed is:

In a metal band cutter, a first handle having an integral anvil portion at one end thereof, said anvil portion having a substantially flat upper face, a centrally arranged elongated slot extending through said anvil portion and forming spaced parallel bars, said bars being joined at both ends; a pin extending across said slot; a second handle having an integral cutting and gripping blade on one end thereof, said blade being offset relative to the longitudinal axis of said handle, a rectangular recess formed in the lower surface of and adjacent to one side of said blade so as to be offset relative to the slot in said anvil, the recess in said blade forming a relatively narrow band gripping flange thereon to one side thereof and a relatively wide portion on the other side thereof, said wide portion being chamfered and relieved; said blade being pivoted on said pin; an upstanding relatively narrow flange on one side of said anvil bars, a single cutting surface on one side of said upstanding flange, said anvil bar being offset adjacent said upstanding flange to provide a flat face therebelow, said upstanding flange being narrower in width than the recess in said blade and having a single cutting surface at one side thereof, and a single cutting surface on one side of said recess, the slot in said anvil being wider than the wide portion of said blade so as to be movable thereinto whereby when said blade progressively cuts across a metal band one portion of the severed band is progressively bent downwardly by the wide portion of said blade so that the severed end freely projects into said slot, and another portion of the severed band is progressively gripped between the narrow flange on said anvil and the inset face of said anvil so that the severed end freely projects upwardly into said recess.

References Cited by the Examiner

UNITED STATES PATENTS

| | | | |
|---|---|---|---|
| 183,404 | 10/1876 | Locke | 30—134 |
| 201,006 | 3/1878 | Hale | 30—134 |
| 2,163,088 | 6/1939 | Grant | 30—258 |
| 2,865,099 | 12/1958 | Blackwood | 30—134 X |
| 3,058,213 | 10/1962 | Sandsto | 30—134 |

WILLIAM FELDMAN, *Primary Examiner.*

R. V. PARKER, JR., *Assistant Examiner.*